(12) United States Patent
Acharya et al.

(10) Patent No.: US 6,293,106 B1
(45) Date of Patent: Sep. 25, 2001

(54) MAGNETIC REFRIGERATION SYSTEM WITH MULTICOMPONENT REFRIGERANT FLUID FORECOOLING

(75) Inventors: Arun Acharya, East Amherst; Bayram Arman, Grand Island, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/572,844

(22) Filed: May 18, 2000

(51) Int. Cl.$^7$ ...................................................... F25B 21/00
(52) U.S. Cl. ................................................................ 62/3.1
(58) Field of Search ...................................................... 62/3.1

(56) References Cited

U.S. PATENT DOCUMENTS

| | | | |
|---|---|---|---|
| 4,778,497 | 10/1988 | Hanson et al. | 62/11 |
| 4,829,770 | * 5/1989 | Hashimoto | 62/3.1 |
| 5,156,003 | * 10/1992 | Yoshiro et al. | 62/3.1 |
| 5,441,658 | 8/1995 | Boyarsky et al. | 252/67 |
| 5,641,424 | * 6/1997 | Ziolo et al. | 252/67 |
| 5,743,095 | 4/1998 | Gschneidner, Jr. et al. | 62/3.1 |
| 5,799,505 | 9/1998 | Bonaquist et al. | 62/613 |
| 5,836,173 | 11/1998 | Lynch et al. | 62/613 |
| 5,934,078 | 8/1999 | Lawton, Jr. et al. | 62/3.1 |
| 6,041,620 | 3/2000 | Olszewski et al. | 62/612 |
| 6,041,621 | 3/2000 | Olszewski et al. | 62/613 |

* cited by examiner

Primary Examiner—William Doerrler
Assistant Examiner—Malik N. Drake
(74) Attorney, Agent, or Firm—Stanley Ktorides

(57) ABSTRACT

A system for generating refrigeration and providing refrigeration to a heat load at a very cold temperature which includes a forecooling circuit using a multicomponent refrigerant fluid and a magnetic refrigeration circuit which provides refrigeration to the heat load and which rejects heat into the forecooling circuit.

10 Claims, 3 Drawing Sheets

MAGNETIC REFRIGERATION SYSTEM WITH MULTICOMPONENT REFRIGERANT FLUID FORECOOLING

TECHNICAL FIELD

This invention relates generally to refrigeration and, more particularly, to the generation and provision of refrigeration at a very cold temperature such as to liquefy gases such as hydrogen.

BACKGROUND ART

The liquefaction of certain gases such as neon, hydrogen or helium requires the generation of very low temperature refrigeration. For example, at atmospheric pressure neon liquefies at 27.1 K, hydrogen liquefies at 20.39 K, and helium liquefies at 4.21 K. The generation of such very low temperature refrigeration is very expensive. Inasmuch as the use of fluids such as neon, hydrogen and helium are becoming increasingly important in such fields as energy generation, energy transmission, and electronics, any improvement in systems for the liquefaction of such fluids would be very desirable. Systems which generate refrigeration at very low temperatures are known but generally are effective only on a relatively small scale.

Accordingly, it is an object of this invention to provide a system which can generate and provide refrigeration effectively at very cold temperature.

It is another object of this invention to provide an improved system for generating refrigeration sufficient to liquefy hard to liquefy fluids such as neon, hydrogen or helium.

It is a further object of this invention to provide a system for liquefying hard to liquefy fluids such as neon, hydrogen or helium which can operate at a relatively high production level.

SUMMARY OF THE INVENTION

The above and other objects, which will become apparent to those skilled in the art upon a reading of this disclosure, are attained by the present invention, one aspect of which is:

A method for providing refrigeration at a very cold temperature comprising:

(A) compressing a multicomponent refrigerant fluid, cooling the compressed multicomponent refrigerant fluid to produce cooled multicomponent refrigerant fluid, and expanding the cooled multicomponent refrigerant fluid;

(B) magnetizing a regenerator bed of a magnetic refrigerator system to warm the regenerator bed, warming working fluid by passing it through the magnetic refrigerator system, and then passing the working fluid from the magnetic refrigerator system in indirect heat exchange with the cooled expanded multicomponent refrigerant fluid to produce cooled working fluid;

(C) demagnetizing the regenerator bed to cool the regenerator bed, and passing the cooled working fluid through the magnetic refrigerator system to further cool the working fluid to be at a very cold temperature; and (D) passing refrigeration from the very cold temperature working fluid to a heat load.

Another aspect of the invention is:

Apparatus for providing refrigeration at a very cold temperature comprising:

(A) a compressor, a multicomponent refrigerant fluid heat exchanger, means for passing fluid from the compressor to the multicomponent refrigerant fluid heat exchanger, an expansion device, and means for passing fluid from the multicomponent refrigerant fluid heat exchanger to the expansion device;

(B) an intermediate temperature heat exchanger and means for passing fluid from the multicomponent refrigerant fluid heat exchanger to the intermediate temperature heat exchanger;

(C) a magnetic refrigerator system comprising a bed of magnetizable bed material, means for magnetizing the magnetizable bed material, means for passing fluid from the magnetic refrigerator system to the intermediate temperature heat exchanger, and means for passing fluid from the intermediate temperature heat exchanger to the magnetic refrigerator system; and (D) a heat load and means for passing fluid from the magnetic refrigerator system in heat exchange with the heat load.

As used herein the term "multicomponent refrigerant fluid" means a fluid comprising two or more species and capable of generating refrigeration.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant generally is at least 10° C., preferably at least 20° C. and most preferably at least 50° C.

As used herein the term "very cold temperature" means a temperature of 90K or less.

As used herein the term "indirect heat exchange" means the bringing of fluids into heat exchange relation without any physical contact or intermixing of the fluids with each other.

As used herein the term "direct heat exchange" means the transfer of refrigeration through contact of the cooling and heating entities.

As used herein the term "expansion" means to effect a reduction in pressure.

As used herein the term "atmospheric gas" means one of the following: nitrogen ($N_2$), argon (Ar), krypton (Kr), xenon (Xe), neon (Ne), carbon monoxide (CO), carbon dioxide ($CO_2$), oxygen ($O_2$), deuterium ($D_2$), hydrogen ($H_2$) and helium (He).

As used herein the term "magnetize" means to induce magnetic properties to a substance by use of an externally applied electrical field.

As used herein the term "heat load" means the application of a given quantity of heat to a particular body or substance.

DETAILED DESCRIPTION

In general the invention comprises the generation of refrigeration to very cold temperatures using a multicomponent refrigerant fluid refrigeration system and an active magnetic regenerator refrigeration system. The multicomponent refrigerant fluid system is integrated with the magnetic regenerator system in a defined manner whereby heat from the magnetic regenerator system is rejected into the multicomponent refrigerant fluid system, enabling the generation of very cold temperature refrigeration for a heat load such as for the bringing of a relatively large quantity of product fluid to very cold conditions.

Figure 1:
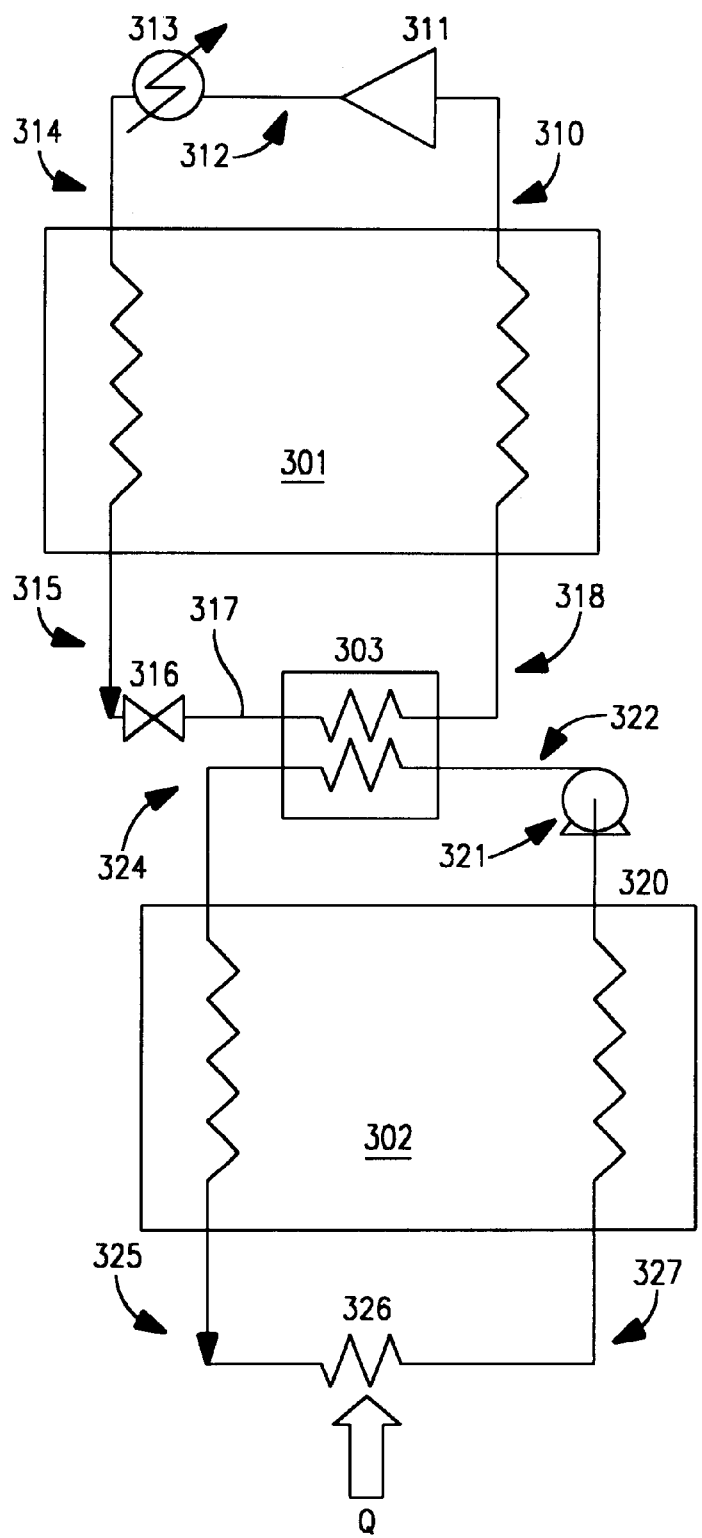
FIG. 1 is a simplified schematic representation of one preferred embodiment of the invention.

The invention will be described in greater detail with reference to the Drawings. Referring now to FIG. 1, multicomponent refrigerant fluid in stream 310 is compressed in compressor 311 to a pressure generally within the range of from 50 to 1000 pounds per square inch absolute (psia). The multicomponent refrigerant fluid useful in the practice of this invention generally comprises at least one atmospheric gas preferably nitrogen, argon and/or neon, and preferably at least one fluorine containing compound having up to six carbon atoms such as fluorocarbons, hydrofluorocarbons, hydrochlorofluorocarbons, fluoroethers and hydrofluoroethers, and/or at least one hydrocarbon having up to five carbon atoms.

One preferable embodiment of the multicomponent refrigerant fluid useful in the practice of this invention comprises at least two components from the group consisting of fluorocarbons, hydrofluorocarbons, fluoroethers and hydrofluoroethers.

Another preferable embodiment of the multicomponent refrigerant fluid useful in the practice of this invention comprises at least one component from the group consisting of fluorocarbons, hydrofluorocarbons, fluoroethers and hydrofluoroethers, and at least one atmospheric gas.

Another preferable embodiment of the multicomponent refrigerant fluid useful in the practice of this invention comprises at least two components from the group consisting of fluorocarbons, hydrofluorocarbons, fluoroethers and hydrofluoroethers, and at least two atmospheric gases.

Another preferable embodiment of the multicomponent refrigerant fluid useful in the practice of this invention comprises at least one fluoroether and at least one component from the group consisting of fluorocarbons, hydrofluorocarbons, fluoroethers and atmospheric gases.

In one preferred embodiment the multicomponent refrigerant fluid consists solely of fluorocarbons. In another preferred embodiment the multicomponent refrigerant fluid consists solely of fluorocarbons and hydrofluorocarbons. In another preferred embodiment the multicomponent refrigerant fluid consists solely of fluorocarbons and atmospheric gases. In another preferred embodiment the multicomponent refrigerant fluid consists solely of fluorocarbons, hydrofluorocarbons, fluoroethers and hydrofluoroethers. In another preferred embodiment the multicomponent refrigerant fluid consists solely of fluorocarbons, fluoroethers, hydrofluoroethers and atmospheric gases.

The multicomponent refrigerant fluid useful in the practice of this invention may contain other components such as hydrochlorofluorocarbons and/or hydrocarbons. Preferably, the multicomponent refrigerant fluid contains no hydrochlorofluorocarbons. In another preferred embodiment of the invention the multicomponent refrigerant fluid contains no hydrocarbons. Most preferably the multicomponent refrigerant fluid contains neither hydrochlorofluorocarbons nor hydrocarbons. Most preferably the multicomponent refrigerant fluid is non-toxic, non-flammable and non-ozone-depleting and most preferably every component of the multicomponent refrigerant fluid is either a fluorocarbon, hydrofluorocarbon, fluoroether or atmospheric gas.

Compressed multicomponent refrigerant fluid 312 is then cooled of the heat of compression in cooler 313 by indirect heat exchange with a suitable cooling fluid such as cooling water, and resulting multicomponent refrigerant fluid 314 is passed through multicomponent refrigerant fluid heat exchanger 301 wherein it is cooled by indirect heat exchange with warming multicomponent refrigerant fluid as will be further described below. The cooled multicomponent refrigerant fluid 315 is passed from heat exchanger 301 to expansion device 316, which is preferably an expansion valve, wherein it is throttled to a lower pressure thereby lowering its temperature. The reduction in temperature of the multicomponent refrigerant fluid as a consequence of its expansion in expansion device 316 serves to cool, generally to at least partially condense, and preferably serves to totally condense, the multicomponent refrigerant fluid. This resulting multicomponent refrigerant fluid is then passed in line 317 to intermediate temperature heat exchanger 303. Generally the temperature of the cooled expanded fluid in stream 317 is within the range of from 50 to 250K.

Magnetic refrigerator system 302 comprises a housing containing magnetizable bed material. One or more beds of magnetizable bed material may be used for the magnetic refrigerator system of this invention. Among the suitable magnetizable bed materials which may be used in the practice of this invention, one can name $GdNi_2$, $GdZn_2$, $GdTiO_3$, $Gd_2Ni_{17}$, $GdAl_2$, $GdMg$, $GdCd$, $Gd_4Co_3$, $GdGa$, $Gd_5Si_4$ and $GdZn$.

The bed of magnetizable material is magnetized thereby serving to raise the temperature of the bed. Working fluid, such as for example helium, neon, nitrogen, argon, methane, carbontetrafluoride fluorocarbons, hydrofluorocarbons, fluoroethers and hydrofluoroethers, is used for heat transfer with the bed.

Working fluid 327 is passed through system 302 and emerges therefrom as warm working fluid 320. The warm working fluid 320 is passed through pump 321 and then as stream 322 is passed to intermediate temperature heat exchanger 303 wherein it is cooled by indirect heat exchange with warming multicomponent refrigerant fluid which was provided to intermediate temperature heat exchanger 303 in stream 317. The resulting warmed multicomponent refrigerant fluid exits intermediate temperature heat exchanger 303 in stream 318 and is passed to multicomponent refrigerant fluid heat exchanger 301. Within multicomponent refrigerant fluid heat exchanger 301, the multicomponent refrigerant fluid is warmed still further by indirect heat exchange with the cooling multicomponent refrigerant fluid brought to heat exchanger 301 in stream 314 as was previously discussed, and resulting still further warmed multicomponent refrigerant fluid is passed from heat exchanger 301 in line 310 to compressor 311 and the multicomponent refrigerant fluid forecooling refrigeration cycle starts anew.

As the working fluid passes through intermediate temperature heat exchanger 303 it is cooled to an intermediate temperature, emerging therefrom as intermediate temperature working fluid 324 having a temperature generally within the range of from 50 to 250K The bed of magnetic refrigerator system 302 is demagnetized thereby cooling the bed material. Intermediate temperature working fluid 324 passes to and through system 302 and in the process is further cooled. The resulting further cooled working fluid emerges from system 302 as very cold temperature working fluid 325 which may be in gaseous, liquid or mixed phase form.

Very cold temperature working fluid 325 is brought into heat exchange with a heat load thereby passing refrigeration from the very cold temperature working fluid to the heat load. The heat exchange may be by indirect or by direct heat exchange. In FIG. 1, the heat load is represented by the arrow labeled Q and the heat exchange is represented by heat exchanger 326. Examples of heat loads in the practice of this invention include air conditioners for the cooling of homes, offices, buildings and automobiles; home or commercial refrigerators for the cooling of food; food freezers for the freezing of food; liquefiers for industrial gases such as natural gas, oxygen, nitrogen, argon and neon; heat pumps; water condensers; and coolers such as may be used in waste separation and treatment systems. The heat exchange in heat exchanger 326 could also be with a multicomponent refrigerant fluid in a refrigeration circuit used to generate refrigeration for even lower temperatures. The heat exchange with the heat load warms the working fluid and resulting working fluid 327 is passed to magnetic refrigerator system 302 for warming as was previously described, and the very cold temperature refrigeration cycle starts anew.

Magnetic refrigeration operates on the magnetocaloric effect. The temperature of a bed of magnetic particles is charged with an applied magnetic field. The temperature result of applying a magnetic field to a magnetic particle is extremely rapid. Typically helium gas is used as a heat transfer fluid to move the heat or refrigeration generated by the magnetic particles to the working fluid.

Figure 2:
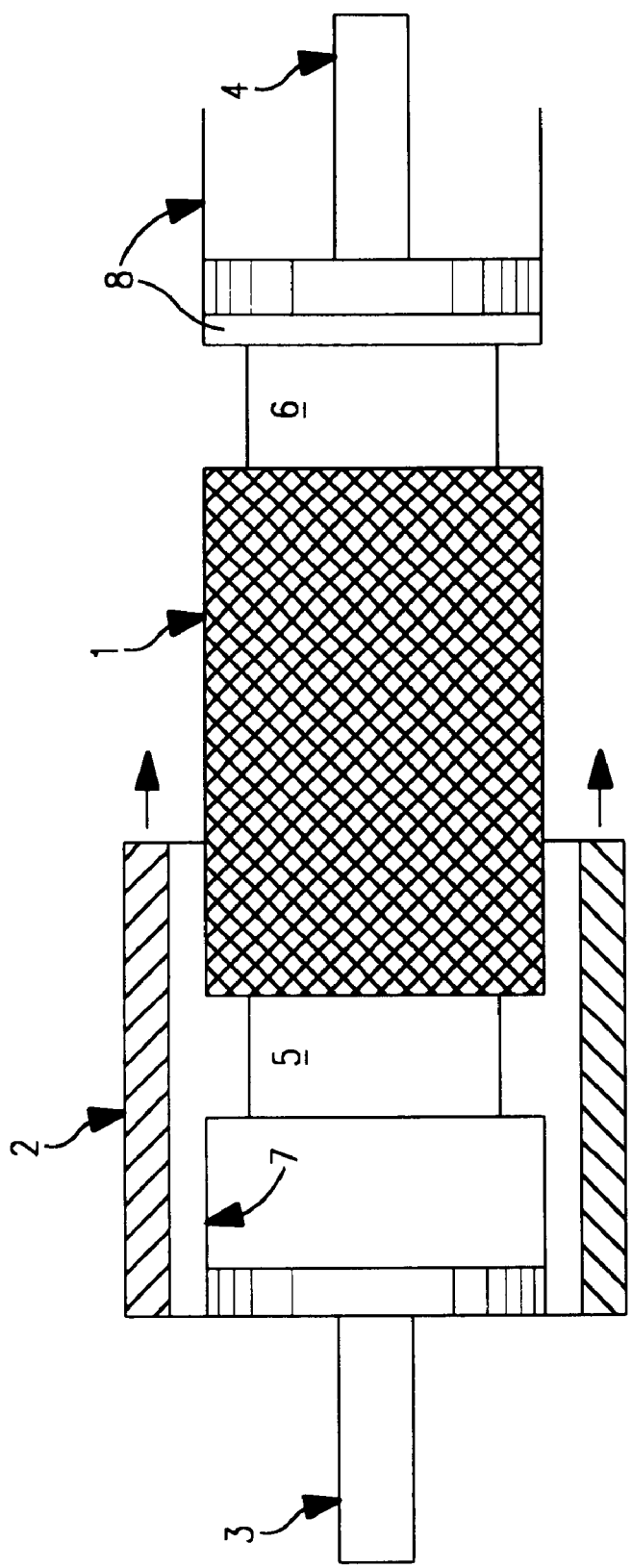
FIG. 2 is a cross sectional representation of one embodiment of an active magnetic regenerator refrigeration system which may be used in the practice of this invention.

One example of an active magnetic regenerator refrigeration system useful in the practice of this invention is shown in FIG. 2. Referring now to FIG. 2, the system includes porous granular magnetic bed 1, a moveable strong electromagnet or superconducting magnet 2, two pistons 3 and 4, a cold heat exchanger 5, and a hot heat exchanger 6. The void space surrounding the magnetic bed particles in bed 1 and the volumes in piston cylinders 7 and 8 are filled with helium gas under pressure. Magnetic bed 1 may be composed of a number of different magnetic materials; gadolinium nickel ($GdNi_2$) is one example. In other embodiments of magnetic refrigeration systems there may be employed more than one moveable magnet, or the bed or beds of magnetizable material may themselves be moveable.

At the beginning of the cycle cold heat exchanger 5 is initially at a low temperature, e.g. 40K, and hot heat exchanger 6 is at a warmer temperature, e.g. 70K. Magnet 2 is moved to the right and thus the magnetic field surrounding magnetic regenerator bed 1 is increased. The magnetocaloric effect causes each magnetic particle in bed 1 to warm slightly. Pistons 3 and 4 are moved to their extreme right position causing the enclosed helium gas to flow from the left cylinder 7, through cold heat exchanger 5, magnetic refrigerator bed 1 and hot heat exchanger 6 to fill the volume in cylinder 8. The particles in bed 1 are cooled by the flowing gas, and the gas in turn is warmed. Heat from the gas is transferred to the working fluid as the gas flows through hot heat exchanger 6. When the pistons have reached their extreme right position the gas flow is stopped and the magnetic field is removed by repositioning magnet 2 to the left end, cooling bed 1 by the magnetocaloric effect. Pistons 3 and 4 are moved back to their extreme left positions causing the helium gas to flow from cylinder 8, through hot heat exchanger 6, magnetic refrigerator bed 1 and cold heat exchanger 5 into cylinder volume 7. The helium gas is cooled as it passes through bed 1 and is warmed in cold heat exchanger 5 as it cools by indirect heat exchange the working fluid passing therethrough.

Although the invention has been described in detail with reference to a certain preferred embodiment, those skilled in the art will recognize that there are other embodiments of the invention within the spirit and the scope of the claims.

Figure 3:
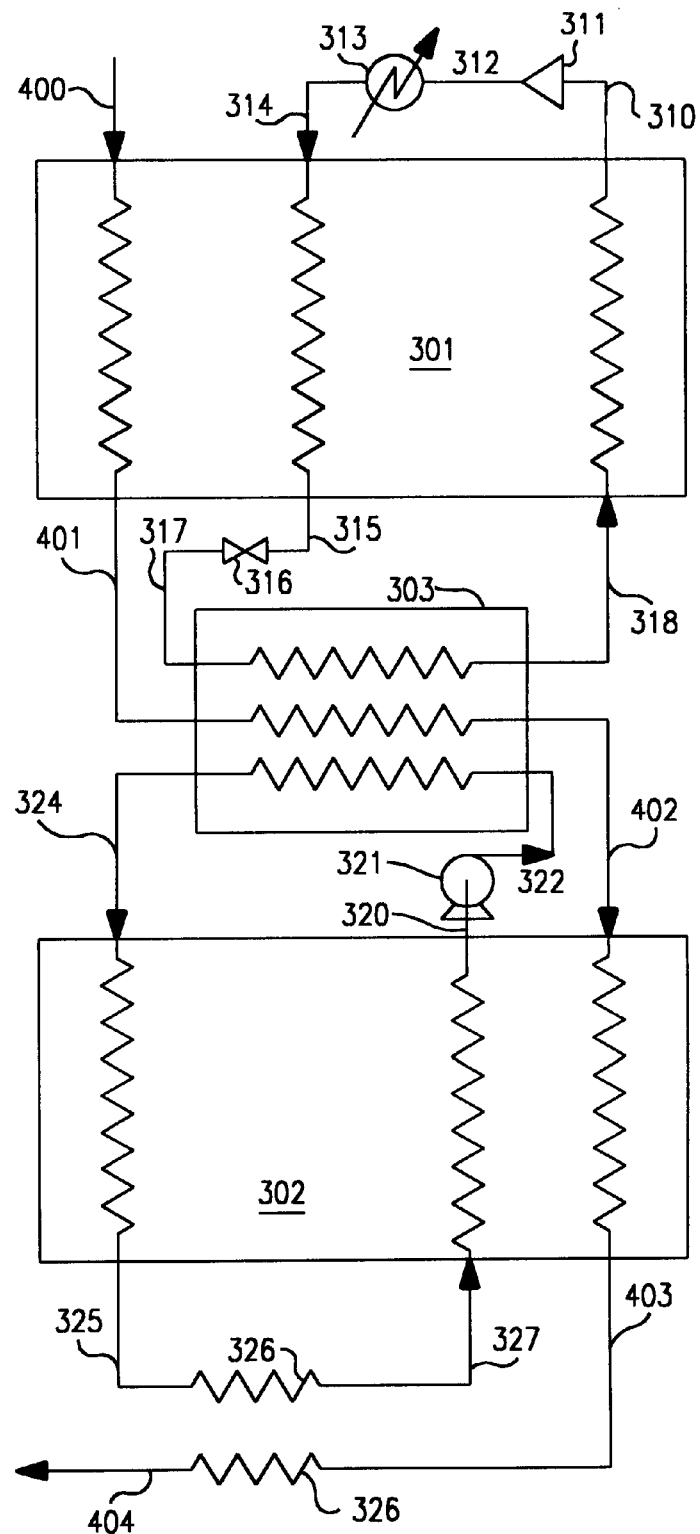
FIG. 3 is a simplified schematic representation of another preferred embodiment of the invention which is particularly useful for the liquefaction of a process gas.

One such other embodiment is illustrated in FIG. 3. The numerals in FIG. 3 are the same as those of FIG. 1 for the common elements and these common elements will not be described again in detail. The embodiment illustrated in FIG. 3 is particularly applicable for liquefaction of a process gas such as oxygen, nitrogen, argon or natural gas. Referring now to FIG. 3, process gas stream 400 is precooled in heat exchanger 301 by indirect heat exchange with the multicomponent refrigerant fluid, and then as stream 401 is further cooled in heat exchanger 303 by indirect heat exchange with both the multicomponent refrigerant fluid and the working fluid from the magnetic refrigerator system. The resulting process gas 402 is at least partially condensed in system 302 and then passed as stream 403 to heat exchanger 326 as the heat load wherein the liquefaction of the process gas is completed with possible subcooling of the condensed process fluid. The resulting liquefied process gas stream 404 is then passed to storage or otherwise recovered.

What is claimed is:

1. A method for providing refrigeration at a very cold temperature comprising:

(A) compressing a multicomponent refrigerant fluid, cooling the compressed multicomponent refrigerant fluid to produce cooled multicomponent refrigerant fluid, and expanding the cooled multicomponent refrigerant fluid;

(B) magnetizing a regenerator bed of a magnetic refrigerator system to warm the regenerator bed, warming working fluid by passing it through the magnetic refrigerator system, and then passing the working fluid from the magnetic refrigerator system in indirect heat exchange with the cooled expanded multicomponent refrigerant fluid to produce cooled working fluid;

(C) demagnetizing the regenerator bed to cool the regenerator bed, and passing the cooled working fluid through the magnetic refrigerator system to further cool the working fluid to be at a very cold temperature; and (D) passing refrigeration from the very cold temperature working fluid to a heat load.

2. The method of claim 1 wherein the expanded multicomponent refrigerant fluid is at least partially condensed.

3. The method of claim 1 wherein the expanded multicomponent refrigerant fluid is completely condensed.

4. The method of claim 1 wherein the multicomponent refrigerant fluid comprises at least one atmospheric gas.

5. The method of claim 1 wherein the multicomponent refrigerant fluid is a variable load refrigerant.

6. The method of claim 1 further comprising cooling process gas by indirect heart exchange with the multicomponent refrigerant fluid and thereafter condensing the process gas by indirect heat exchange with the working fluid.

7. Apparatus for providing refrigeration at a very cold temperature comprising:

(A) a compressor, a multicomponent refrigerant fluid heat exchanger, means for passing fluid from the compressor to the multicomponent refrigerant fluid heat exchanger, an expansion device, and means for passing fluid from the multicomponent refrigerant fluid heat exchanger to the expansion device;

(B) an intermediate temperature heat exchanger and means for passing fluid from the multicomponent refrigerant fluid heat exchanger to the intermediate temperature heat exchanger;

(C) a magnetic refrigerator system comprising a bed of magnetizable bed material, means for magnetizing the magnetizable bed material, means for passing fluid from the magnetic refrigerator system to the intermediate temperature heat exchanger, and means for passing fluid from the intermediate temperature heat exchanger to the magnetic refrigerator system; and (D) a heat load and means for passing fluid from the magnetic refrigerator system in heat exchange with the heat load.

8. The apparatus of claim 7 further comprising means for passing process gas to the multicomponent refrigerant fluid heat exchanger, from the multicomponent refrigerant fluid heat exchanger to the intermediate temperature heat exchanger, and from the intermediate heat exchanger to the magnetic refrigerator system.

9. The apparatus of claim 7 wherein the magnetic refrigerator system comprises two piston cylinders on opposite sides of the bed of magnetizable bed material for passing gas from one piston cylinder through the bed to the other piston cylinder.

10. The apparatus of claim 7 wherein the means for magnetizing the magnetizable bed material comprises at least one movable magnet.

* * * * *